(12) United States Patent
Cuypers

(10) Patent No.: US 10,218,500 B2
(45) Date of Patent: *Feb. 26, 2019

(54) AUTHENTICATION OF A CARD BY CONTACTLESS READING

(71) Applicant: PROTON WORLD INTERNATIONAL N.V., Diegem (BE)

(72) Inventor: Frank Cuypers, De Pinte (BE)

(73) Assignee: PROTON WORLD INTERNATIONAL N.V., Diegem (BE)

( * ) Notice: Subject to any disclaimer, the term of this patent is extended or adjusted under 35 U.S.C. 154(b) by 144 days.

This patent is subject to a terminal disclaimer.

(21) Appl. No.: 15/332,746

(22) Filed: Oct. 24, 2016

(65) Prior Publication Data

US 2017/0353303 A1    Dec. 7, 2017

(30) Foreign Application Priority Data

Jun. 3, 2016 (FR) ..................... 16 55075

(51) Int. Cl.
*H04L 29/06* (2006.01)
*H04L 9/08* (2006.01)
(Continued)

(52) U.S. Cl.
CPC ...... *H04L 9/0822* (2013.01); *G06K 19/07749* (2013.01); *H04L 9/0637* (2013.01); *H04L 9/14* (2013.01); *H04L 9/3271* (2013.01); *H04L 63/06* (2013.01); *H04L 63/0876* (2013.01); *H04W 12/04* (2013.01); *H04W 12/06* (2013.01)

(58) Field of Classification Search
None
See application file for complete search history.

(56) References Cited

U.S. PATENT DOCUMENTS 7,673,153 B1    3/2010 Oishi et al.
2002/0183985 A1 12/2002 Hori et al.
(Continued)

OTHER PUBLICATIONS

Finkenzeller, *RFID Handbook: Radio-Frequency Identification Fundamentals and Applications*, John Wiley & Sons, Ltd, 1999, pp. 151-158. (10 pages).
(Continued)

*Primary Examiner* — Malcolm Cribbs
(74) *Attorney, Agent, or Firm* — Seed IP Law Group LLP

(57) ABSTRACT

The invention relates to a method of authentication of a contactless communication circuit, PICC, by a contactless communication terminal, PCD. Within the PICC, a first number is generated by encryption of a second random number, and the first number is sent to the PCD. Within the PCD, a third number is generated by decryption of the first number. Also within the PCD, a fourth number is determined and encrypted to generate a fifth number. The fifth number has first and second portions. Back within the PICC, a sixth number is determined, which is used in the determination of a seventh number. The seventh number is determined by encryption by a cipher block chaining operating mode of the sixth number with an initialization vector equal to the first portion. If the seventh number is different from the second portion, the authentication is interrupted.

19 Claims, 7 Drawing Sheets

(51) Int. Cl.
  *H04L 9/06* (2006.01)
  *H04L 9/32* (2006.01)
  *G06K 19/077* (2006.01)
  *H04L 9/14* (2006.01)
  *H04W 12/04* (2009.01)
  *H04W 12/06* (2009.01)

(56) References Cited

U.S. PATENT DOCUMENTS

| | | | | |
|---|---|---|---|---|
| 2004/0010449 | A1* | 1/2004 | Berardi | G06Q 20/00 |
| | | | | 705/16 |
| 2006/0045110 | A1* | 3/2006 | Miura | H04L 12/2803 |
| | | | | 370/408 |
| 2006/0050877 | A1* | 3/2006 | Nakamura | G06F 21/445 |
| | | | | 380/46 |
| 2009/0313689 | A1* | 12/2009 | Nystrom | H04W 12/06 |
| | | | | 726/9 |
| 2010/0161966 | A1* | 6/2010 | Kwon | H04L 9/3273 |
| | | | | 713/155 |
| 2010/0166177 | A1 | 7/2010 | Sirio et al. | |
| 2011/0119645 | A1 | 5/2011 | Koizumi | |
| 2011/0291803 | A1* | 12/2011 | Bajic | G08B 13/2462 |
| | | | | 340/10.1 |
| 2014/0223113 | A1 | 8/2014 | Hadley | |
| 2015/0220727 | A1* | 8/2015 | Pluss | G06K 7/0008 |
| | | | | 726/30 |
| 2017/0243197 | A1* | 8/2017 | Salvador | G06Q 20/342 |

OTHER PUBLICATIONS

Jacobi et al., "MIFARE DESFire EV1 AES Authentication with TRF7970A," Texas Instruments, Application Report SLOA213, Dec. 2014, 20 pages.

Kasper et al., "Side-Channel Analysis of Cryptographic RFIDs with Analog Demodulation," RFIDSec 2011, Amherst, MA, Jun. 26-28, 2011, 18 pages.

Menezes et al., *Handbook of Applied Cryptography*, CRC Press, 1996, pp. 385-424.

Tiri et al., "Side-Channel Leakage Tolerant Architectures," Third International Conference on Information Technology: New Generations, Las Vegas, NV, Apr. 10-12, 2006, 6 pages.

\* cited by examiner

AUTHENTICATION OF A CARD BY CONTACTLESS READING

BACKGROUND

Technical Field

The present disclosure generally relates to electronic circuits and, more specifically, to contactless communication circuits. The present disclosure more specifically aims at the authentication of a contactless communication circuit by a contactless communication terminal.

Description of the Related Art

The communication over a contactless link between a proximity coupling device (PCD), for example, a contactless terminal (Contactless Reader), and a contactless device (Proximity Device—PD), particularly a contactless integrated circuit (Proximity Integrated Circuit—PIC) or a contactless integrated circuit card (Proximity Integrated Circuit Card—PICC), generally starts by an operation of mutual authentication of the proximity device and the proximity coupling device.

The authentication operation comprises a succession of steps of data exchange between the proximity coupling device and the proximity device and of steps of calculation by the proximity coupling device and the proximity device. Some of these steps may be vulnerable to attacks aiming, in particular, at recovering information relative to the encryption method implemented by the proximity device.

BRIEF SUMMARY

It would be desirable to better protect the steps of an operation of authentication of a proximity device by a proximity coupling device.

Thus, an embodiment provides a method of authentication of a contactless communication circuit by a contactless communication terminal, successively comprising:
  a first phase comprising the determination by the contactless communication circuit of a first number, the first phase ending with the transmission of the first number by the contactless communication circuit to the contactless communication terminal;
  a second phase comprising the determination by the contactless communication terminal of a second number, by decryption of the first number by using a first key, the determination by the contactless communication terminal of a third number based on the second number and the determination by the contactless communication terminal of a fourth number by encryption of the third number by using the first key, the second phase ending with the transmission of the fourth number by the contactless communication terminal to the contactless communication circuit; and
  a third phase comprising the decryption by the contactless communication circuit of the fourth number by using the first key to obtain the third number and the interruption by the contactless communication circuit of the authentication if a sixth number obtained from the third number is different from a seventh number,
  wherein the first phase comprises no encryption operation using the first key.

According to an embodiment, the seventh number is determined by the contactless communication circuit based on an eighth number obtained by decryption by the contactless communication circuit of the first number by using the first key.

According to an embodiment, the method comprises, at the first phase, determining a ninth number, the ninth number being random, with no operation of encryption by the contactless communication circuit.

According to an embodiment, in the first phase, the first number is equal to the ninth number.

According to an embodiment, in the first phase, the first number is obtained by encryption by the contactless communication circuit of the ninth number by using a second key different from the first key, the second key having the same size as the first key, the encryption algorithm using the second key being the same as the encryption algorithm using the first key.

According to an embodiment, in the first phase, the first number is obtained by encryption by the contactless communication circuit of a tenth non-random number by using a third key which is random, the third key having the same size as the first key, the encryption algorithm using the third key being the same as the encryption algorithm using the first key.

According to an embodiment, in the first phase, the contactless communication circuit randomly carries out the steps of:
  a) determining the first number as being equal to the result of the encryption of the ninth number with the first key;
  b) determining the first number as being equal to the eighth number.

According to an embodiment, the method further comprises, at step a), determining the eighth number as being equal to the ninth number and, at step b), performing an encryption operation using a fourth key different from the first key, the fourth key having the same size as the first key, the encryption algorithm using the fourth key being the same as the encryption algorithm using the first key.

According to an embodiment, the method further comprises, in the third phase, the carrying out of a step c) by the contactless communication circuit, step c) comprising, when step a) is carried out, performing a decryption operation using a fifth key different from the first key, the fifth key having the same size as the first key, the decryption algorithm using the fifth key being the same as the encryption algorithm using the first key and step c) comprising, when step b) is carried out, determining the eighth number by decryption by the contactless communication circuit of the first number by using the first key.

According to an embodiment, the method successively comprises in the first phase, if a Boolean variable is true, the determination by the contactless communication circuit of the first number as being equal to the result of the encryption of the ninth number with the first key and, if the Boolean variable is false, the reuse by the contactless communication circuit of the last determined value of the first number and comprising setting the Boolean variable to the false state.

According to an embodiment, the method further comprises, in the third phase, the setting by the contactless communication circuit of the Boolean variable to the true state if the sixth number obtained from the fourth number is equal to the seventh number.

According to an embodiment, the method comprises, in the second phase, the determination by the contactless communication terminal of a eleventh number, the eleventh number being random, and the determination by the contactless communication terminal of an twelfth number based on the second number, the third number corresponding to the juxtaposition of the eleventh number and of the twelfth number.

According to an embodiment, the method further comprises, in the third phase, the determination by the contactless communication circuit of an thirteenth number based on the third number, the determination of a fourteenth number by encryption of the thirteenth number with the first key, the third phase ending with the transmission of the fourteenth number by the contactless communication circuit to the contactless communication terminal.

Another embodiment provides a method of authentication of a contactless communication circuit by a contactless communication terminal, successively comprising:

- a first phase comprising the determination by the contactless communication circuit of a first number equal to the result of the encryption of a second number with a first key, the second number being a random number, the first phase ending with the transmission of the first number by the contactless communication circuit to the contactless communication terminal;
- a second phase comprising the determination by the contactless communication terminal of a third number by decryption of the first number by using the first key, the determination by the contactless communication terminal of a fourth number based on the third number and the determination by the contactless communication terminal of a fifth number by encryption of the fourth number by using the first key, the fifth number comprising at least first and second juxtaposed portions, the second phase ending with the transmission of the fifth number by the contactless communication terminal to the contactless communication circuit; and
- a third phase comprising the determination of a sixth number by the contactless communication circuit based on the second number, the determination of a seventh number by encryption by a cipher block chaining operating mode of the sixth number by using the first key and an initialization vector equal to the first portion of the fifth number, and the interruption by the contactless communication circuit of the authentication if the seventh number is different from the second portion of the fifth number.

According to an embodiment, the method further comprises, in the third phase, the decryption by the contactless communication circuit of the fifth number by using the first key to provide the fourth number.

According to an embodiment, the method further comprises, in the third phase, the determination by the contactless communication circuit of an eighth number based on the fourth number, the determination of a ninth number by encryption of the eighth number with the first key, the third phase ending with the transmission of the ninth number by the contactless communication circuit to the contactless communication terminal.

According to an embodiment, each encryption operation performed by the contactless communication circuit comprises providing at least one first message block and one second message block, providing a first encrypted message block by encryption by means of the first key of the result of the XOR function applied between the first message block and an initialization vector, and providing a second encrypted message block by encryption by means of the first key of the result of the XOR function applied between the second message block and the first encrypted message block.

According to an embodiment, the method comprises, in the second phase, the determination by the contactless communication terminal of a tenth number, the tenth number being random, and the determination by the contactless communication terminal of an eleventh number based on the third number, the fourth number corresponding to the juxtaposition of the tenth number and of the eleventh number.

According to an embodiment, the first phase comprises no encryption operation using the first key.

Another embodiment provides a contactless communication circuit comprising a microprocessor programmed to implement the method previously defined.

Another embodiment provides a microcircuit card comprising a circuit programmed to implement the method previously defined.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. One or more embodiments are described hereinafter with reference to the accompanying drawings. The foregoing and other features and advantages will be discussed in detail in the following non-limiting description of specific embodiments in connection with the accompanying drawings, among which.

DETAILED DESCRIPTION

Figure 1:
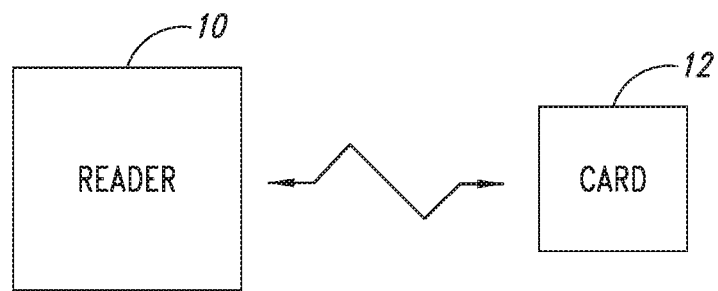
FIG. 1 very schematically shows an embodiment of a proximity communication system.

The same elements have been designated with the same reference numerals in the different drawings. For clarity, only those elements which are useful to the understanding of the described embodiments have been shown and are detailed. In particular, the exchanges between the proximity coupling device and a proximity integrated circuit once the authentication operation has been performed have not been detailed, the described embodiments being compatible with usual exchanges. Unless otherwise specified, expressions "approximately", "substantially", and "in the order of" mean to within 10%, preferably to within 5%.

Embodiments have been described by taking as an example a contactless card forming a proximity integrated circuit card (PICC) and a contactless reader forming a proximity coupling device (PCD). They however more generally apply to any device used as a proximity coupling device and to any contactless communication integrated circuit where similar problems are posed.

FIG. 1 very schematically shows an example of a contactless communication system of the type to which the described embodiments apply.

A contactless communication terminal 10 or proximity reader (READER) generates an electromagnetic field. A contactless card 12 (CARD) located within the range of the reader detects the field and is then capable of exchanging information with reader 10.

Card 12 may host one or a plurality of applications. As an example, these applications may use a technology known as MIFARE. The application to be executed by the card may depend on the reader with which it communicates. Indeed, a reader is generally dedicated to an application (for example, bank, transport, access control, etc.) and the activation of a card in the field of the reader depends on the protocol accepted by the card.

The MIFARE® technology has different variations, particularly the MIFARE® DESFIRE® or MIFARE PLUS® variations. MIFARE®, MIFARE® DESFIRE® and MIFARE PLUS® are registered trademarks of NXP B.V. in the USA. Such variations differ, in particular, by the implemented encryption methods. According to an example, the encryption method corresponds to a symmetrical encryption algorithm, for example, the AES algorithm (Advanced Encryption Standard) or the DES algorithm (Data Encryption Standard) using one key, two keys, or three keys for the encryption.

Figure 2:
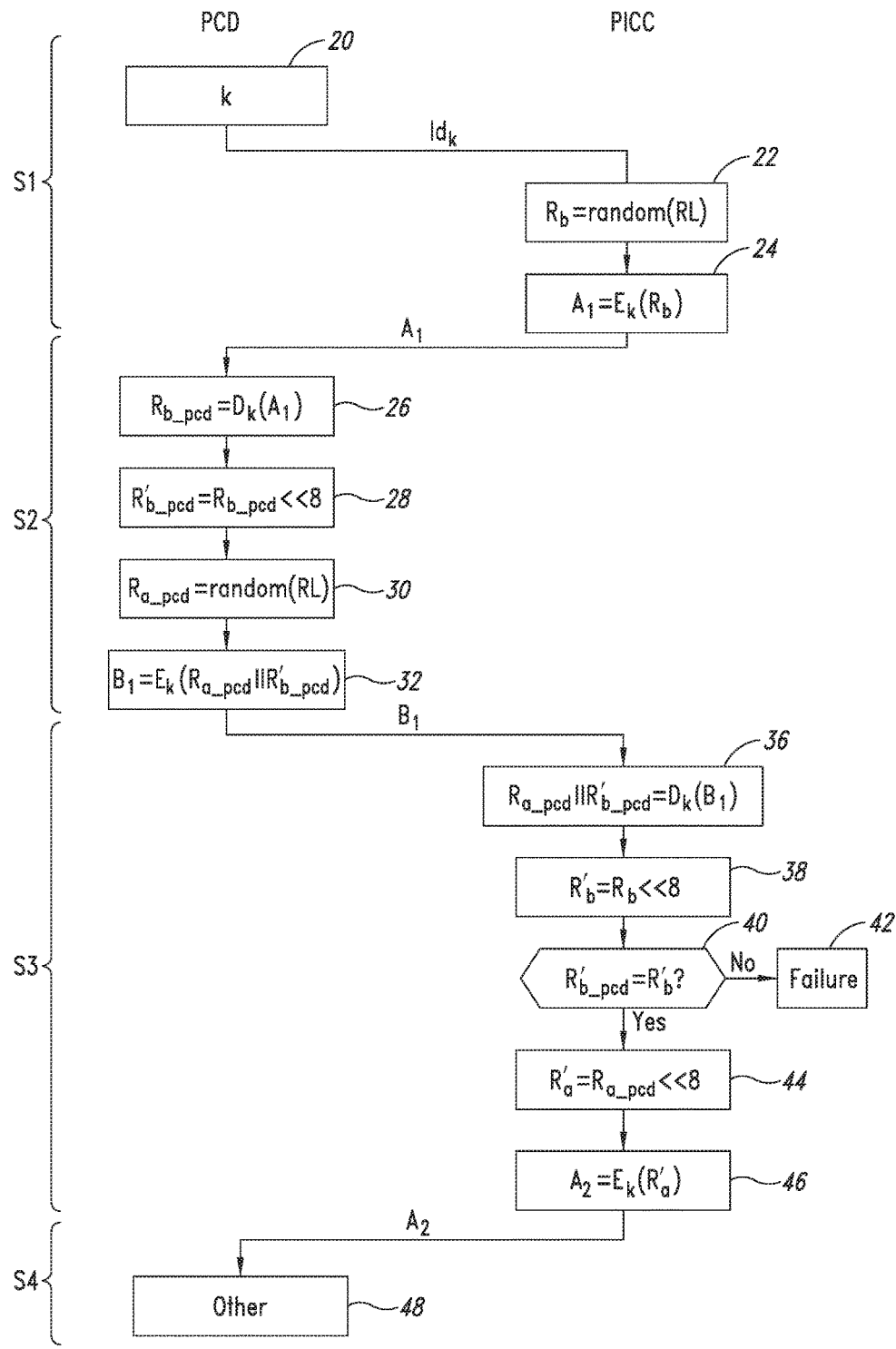
FIG. 2 is a simplified block diagram of a usual example of a method of mutual authentication of a proximity device and a proximity coupling device.

FIG. 2 is a simplified block diagram of a usual example of a method of mutual authentication of a reader and a contactless chip card implementing the MIFARE DESFIRE or MIFARE PLUS technology.

The method of authenticating the PICC card starts when the reader has detected the presence of the card and wants to authenticate the card. Other commands can be sent before the beginning of the authentication. The authentication method comprises successive phases S1, S2, S3, and S4, each comprising successive steps.

The PCD and PD share the knowledge of a number of key values. At phase S1, the reader (PCD) selects a key (step 20) and transmits its identifier $Id_k$ to the card (PICC) with an authentication control signal. The length of key k especially depends on the implemented encryption algorithm. As an example, the length of the key may be 8, 16, or 24 bits.

The card generates a random number $R_b$ of length RL (step 22). Length RL of random number $R_b$ depends on the implemented encryption algorithm. As an example, length RL may be 8 or 16 bits. The card then determines an encrypted message $A_1$ by encryption of random number $R_b$ by using key k with identifier $Id_k$ (step 24) and transmits encrypted message $A_1$ to the reader.

At phase S2, the reader decrypts encrypted message $A_1$ by using the same key k and obtains a random number $R_{b\_pcd}$ (step 26). The reader then determines a random number $R'_{b\_pcd}$ (step 28) based on random number $R_{b\_pcd}$ by left rotating, in binary representation, the bits of random number $R_{b\_pcd}$ by a plurality of bits, for example, 8 bits. The reader generates a new random number $R_{a\_pcd}$ of length RL (step 30). The reader determines a message $R_{a\_pcd}\|R'_{b\_pcd}$ by concatenation of random number $R_{a\_pcd}$ and of random number $R'_{b\_pcd}$ and determines an encrypted message $B_1$ by encryption of message $R_{a\_pcd}\|R'_{b\_pcd}$ by using key k (step 32) and transmits encrypted message $B_1$ to the card.

At phase S3, the card decrypts encrypted message $B_1$ by using key k to obtain message $R_{a\_pcd}\|R'_{b\_pcd}$ (step 36). The card then determines a random number $R'_b$ (step 38) based on random number $R_b$ by left rotating, in binary representation, the bits of random number $R_b$ by a plurality of bits, for example, 8 bits. The card compares random numbers $R'_{b\_pcd}$ and $R'_b$ (step 40). If the two random numbers $R'_{b\_pcd}$ and $R'_b$ are not identical, the card interrupts the authentication operation, which fails (step 42). This corresponds to the authentication of the PCD by the PICC. If the two random numbers $R'_{b\_pcd}$ and $R'_b$ are identical, the card then determines a random number $R'_a$ (step 44) based on random number $R_{a\_pcd}$ by left rotating the bits of random number $R_{a\_pcd}$ by a plurality of bits, for example, by 8 bits. The card determines an encrypted message $A_2$ by encryption of random number $R'_a$ by using key k (step 46) and transmits encrypted message $A_2$ to the reader.

At phase S4, the method may comprise additional steps (step 48), particularly the authentication of the PICC by the PCD by verification of the $A_2$ message, determination of a session key used for subsequent operations of encryption and decryption by the reader and the card. The session key may be obtained from random number $R_a$ and $R_b$.

For methods of card authentication by contact reading, it is known to provide the counting by the card of the number of unsuccessful authentication attempts and to stop the authentication operation when the number of unsuccessful attempts exceeds a threshold. However, the counting by the card of the number of unsuccessful attempts, which is a time-consuming operation, is generally not provided during a contactless card authentication method. Indeed, a person holding a fraudulent PCD close to the PICC could send invalid authentications until the card is blocked. For technologies that do not provide an unblocking mechanism, that leads to a permanent destruction of the card. Moreover, since data exchanges between the card and the reader only occur during the short time for which the card is close to the reader, the authentication operation should be as fast as possible. An attacker may thus carry out as many authentication attempts as he/she wants.

A weakness of the previously-described authentication method is that an attacker can repeat the previously-described steps carried out by the card at phase S1 of the same key k. Each time, a new random number $R_b$ and a new encrypted message $A_1$ are determined. The analysis of a limited number of side channel attack traces and the obtained encrypted messages $A_1$ enables to considerably reduce the key space of possible keys k without then requiring to execute for each repetition the other phases of the authentication method. The fact that the PD generates new random numbers provides the attacker with an interesting distribution of traces. The attacker may then carry out a brute force attack on the reduced key space. The attacker knows that the attack has succeeded when the comparison performed by the card at step 40 of phase S3 does not result in a failure.

Another weakness of the previously-described authentication method is that the encrypted message $B_1$ used by the card at phase S3 may be imposed by the attacker. An attacker can thus repeat decryption step 36 as many times as desired imposing an encrypted message $B_1$ of its choice, taking side channel attack traces. However, an attack using this weakness takes more time since the steps of phases S1 and S2 have to be carried out before each attempt.

Embodiments of an authentication method will be described where the steps executed at phase S1 by the card are modified to prevent an attacker from using these steps to obtain sufficient information relative to key k. The previously-described weakness relative to the steps carried out by the card at phase S1 can then no longer be used by an attacker.

Figure 3:
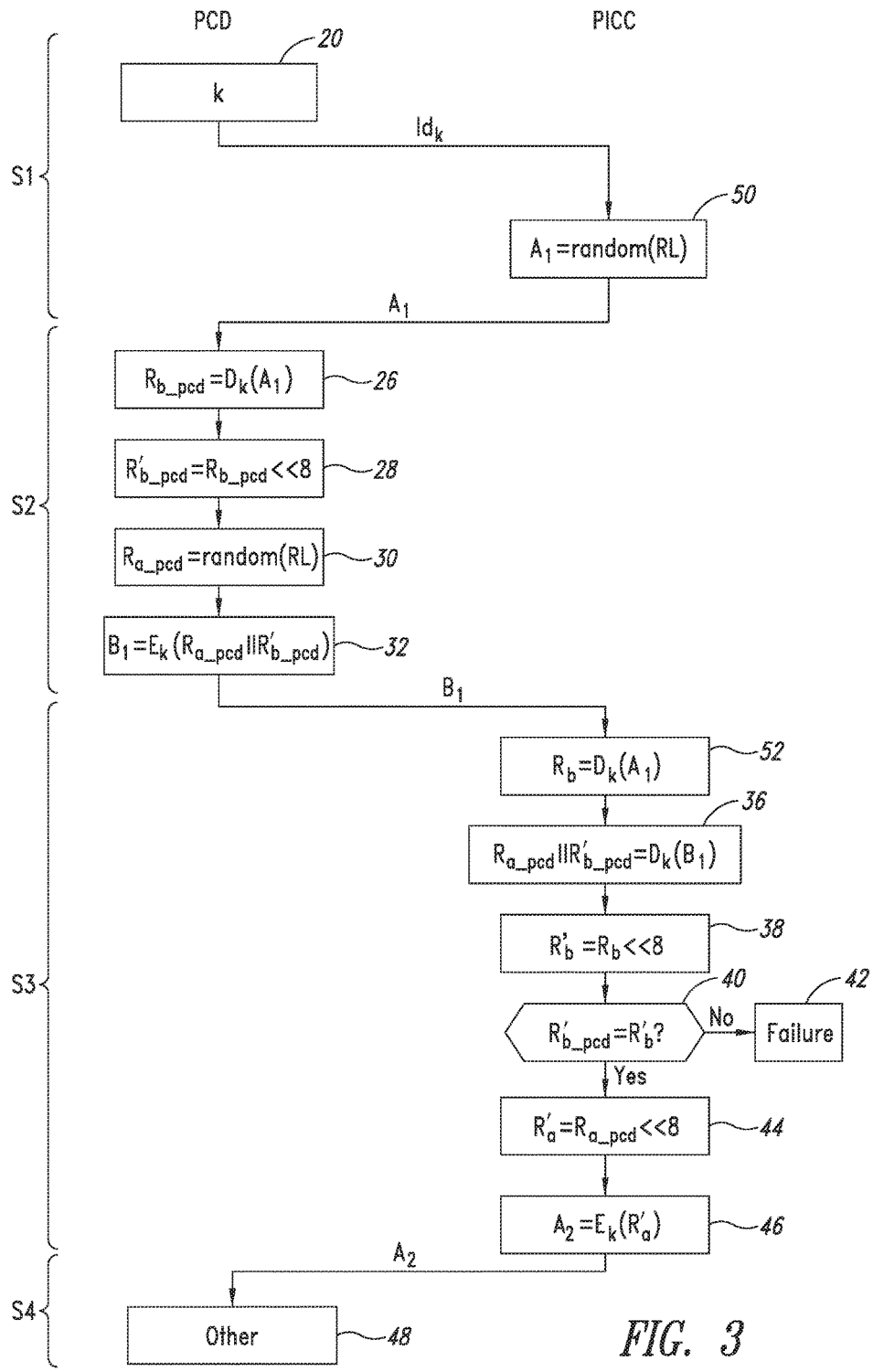
FIGS. 3 to 5 are simplified block diagrams of embodiments of a method of mutual authentication of a proximity device and a proximity coupling device.

FIG. 3 is a simplified block diagram of an embodiment of a method of authentication of a PICC card by a PCD reader. The present embodiment of the authentication method comprises the steps of the authentication method previously described in relation with FIG. 2, with the difference that steps 22 and 24 are replaced with a step 50 where number $A_1$ is directly obtained by generation of a random number of length RL. The present embodiment further comprises, at phase S3, before step 36, a step 52 of determining random number $R_b$ by decryption of number $A_1$ by using key k by the card.

According to a variation, the present embodiment previously-described step 50 is replaced with a step of determining encrypted message $A_1$ by encryption of the random number by using a dummy key different from key k.

According to another variation, at step 50, encrypted message $A_1$ is obtained by encryption of a given number, for example, 0, with a key equal to a random number of length RL.

The previously-described weakness relative to the steps carried out by the card at phase S1 can no longer be used by an attacker since these steps no longer comprise an encryption step using key k.

Figure 4:
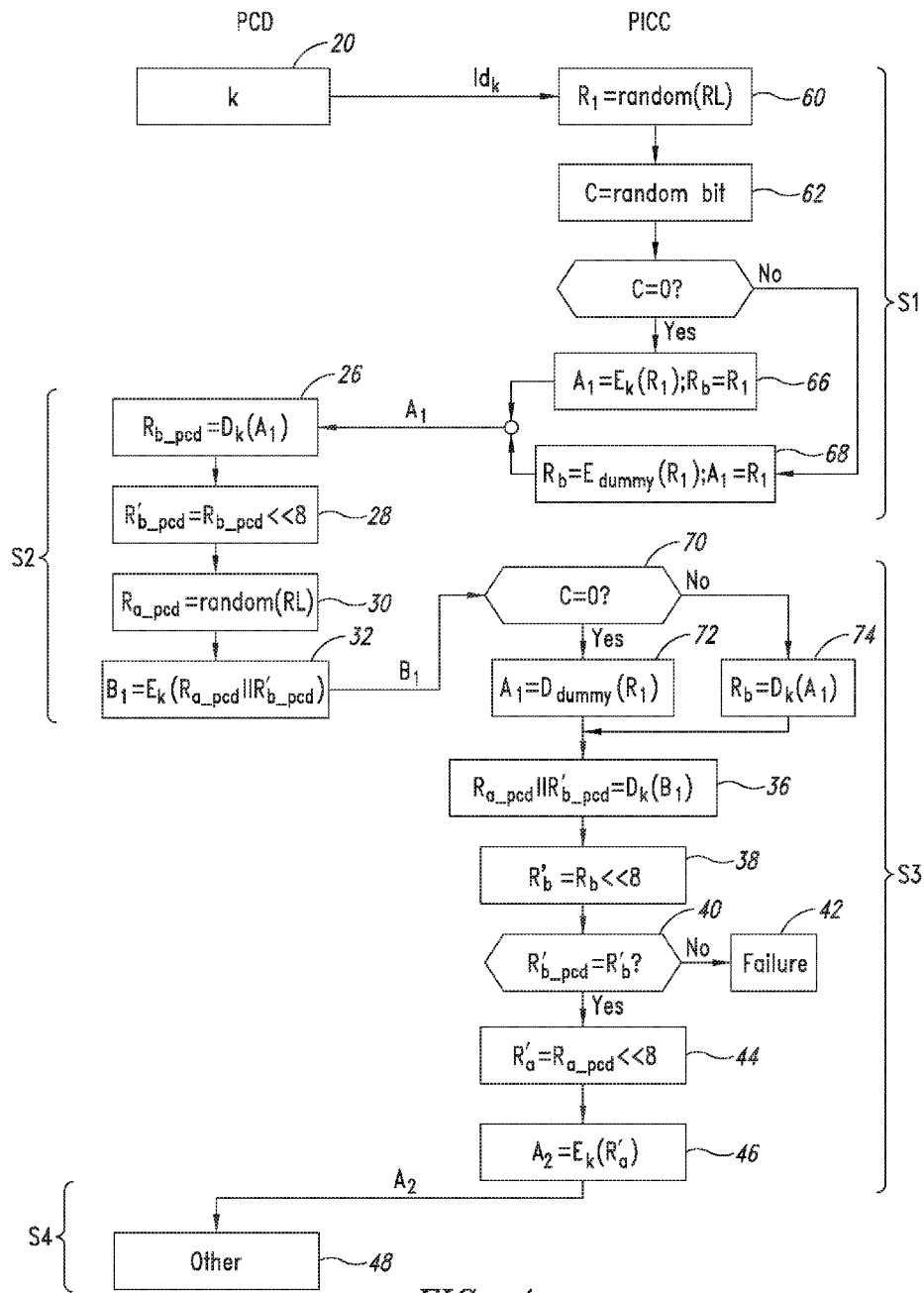

FIG. 4 is a simplified block diagram of another embodiment of a method of card authentication by a reader. In the present embodiment, the method previously described in relation with FIG. 2, or the method previously described in relation with FIG. 3 is randomly implemented.

More specifically, the embodiment of the authentication method comprises the steps of the authentication method previously described in relation with FIG. 2 with the difference that steps 22 and 24 are replaced with steps 60, 62, 64, and 66 described hereafter. The card generates a random number $R_1$ of length RL (step 60). The card determines a random bit c (step 62) and compares it with "0" (step 64). If bit c is equal to "0", the card determines encrypted message $A_1$ by encryption of random number $R_1$ by using key k (step 66) and transmits encrypted message $A_1$ to the reader. The random number $R_b$ used at phase S3 is then equal to random number $R_1$. If bit c is equal to "1", number $A_1$ transmitted by the card to the reader is equal to $R_1$ and the card performs an encryption operation by assigning to number $R_b$ the result of the encryption of random number $R_1$ by using a dummy key different from key k (step 68). The result of this encryption is not used, but assures that using a side channel attack, the case in which c is equal to "1" provides the same trace as the case in which c is equal to "0".

The present embodiment of the authentication method further comprises, at phase S3, before step 36, the additional steps 70, 72, and 74 described hereafter. The card compares random bit c with "0" (step 70). If bit c is equal to "0", that is, when step 66 has been executed at phase S1, the card executes a decryption operation by assigning to $A_1$ the result of a decryption of random number $R_1$ by using a dummy key different from key k (step 72). The result of this decryption is not used, but assures that using a side channel attack, the case in which c is equal to "1" provides the same trace as the case in which c is equal to "0".

If bit c is equal to "0", that is, when step 68 has been executed at phase S1, the card determines random number $R_b$ by decryption of number $A_1$ by using key k (step 74).

The above-described weakness relative to the steps carried out by the card at phase S1 can no longer be used by an attacker since these steps no longer comprise an encryption step using key k. Further, an encryption step is always performed at phase S1 and a decryption step is always performed at phase S2, even if these steps are not necessarily useful according to the value of bit c. This enables to prevent a side channel attack since an attacker cannot tell useful encryption/decryption steps from non-useful ones.

Figure 5:
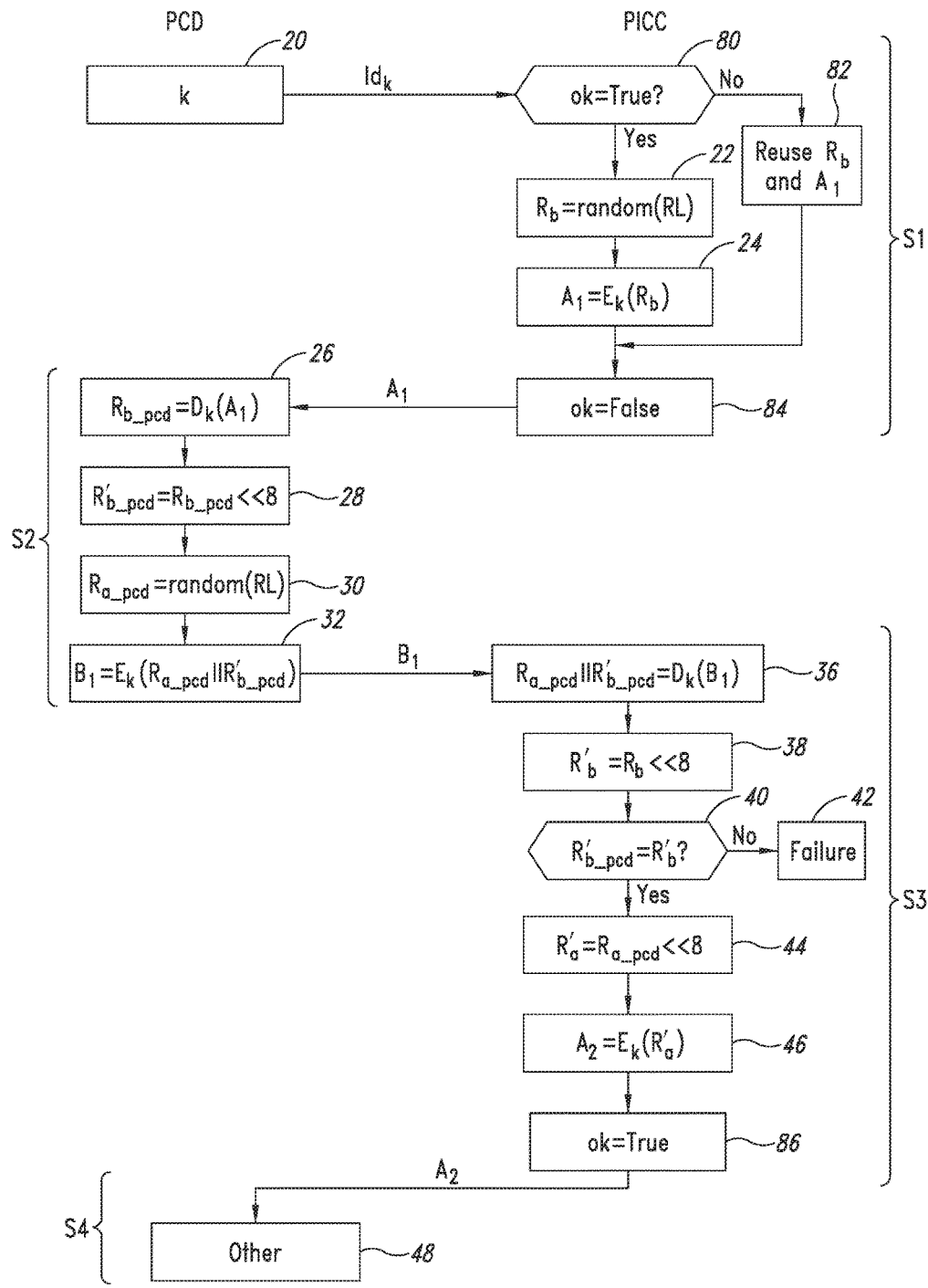

FIG. 5 is a simplified block diagram of another embodiment of a method of card authentication by a reader. In the present embodiment, the card carries out previously-described steps 22 and 24 only if the last authentication procedure has occurred correctly. When the last authentication procedure has not occurred correctly, the random number $R_b$ and the encrypted message $A_1$ used in the last authentication procedure which has occurred correctly are used again.

More specifically, the present embodiment of the authentication method comprises the steps of the authentication method previously described in relation with FIG. 2 and further comprises a step 80 at which the card determines whether a Boolean variable ok is true, variable ok being initialized to the true value at the first card authentication attempt. If variable ok is in the true state, steps 22 and 24 are executed by the card. If variable ok is in the false state, the card uses again the values $R_b$ and $A_1$ determined at the previous authentication procedure (step 82). After having executed steps 22 and 24 or step 82, the card sets variable ok to the false state (step 84). The present embodiment further comprises, after steps 36 to 46, a step 86 at which the card sets variable ok to the true state.

With the present embodiment, an encryption step at phase S1 can only be performed by the card if the previous authentication procedure has occurred correctly. An attack where phase S1 would be repeated without however resulting in a successful authentication, particularly to determine information relative to key k, would not cause, each time phase S1 is repeated, the carrying out of a new encryption step, which limits the useful information that the attacker may expect to recover.

An encryption/decryption operation is made by using at least one encryption/decryption module. An encryption/decryption module has a cipher block length, BL, and is able to encrypt/decrypt messages of the same length as the cipher block length. For example, for the DES algorithm, BL can be 8 bits and for the AES algorithm, BL can be 16 bits. For messages that are longer than BL and corresponds to a multiple of BL, the encryption/decryption operation can be made by cipher block chaining (CBC). —Another embodiment will now be described, which is adapted to the case where the encryption or decryption method used to determine encrypted messages $A_1$ and $B_1$ implements an operating mode by cipher block chaining (CBC).

Figure 6:
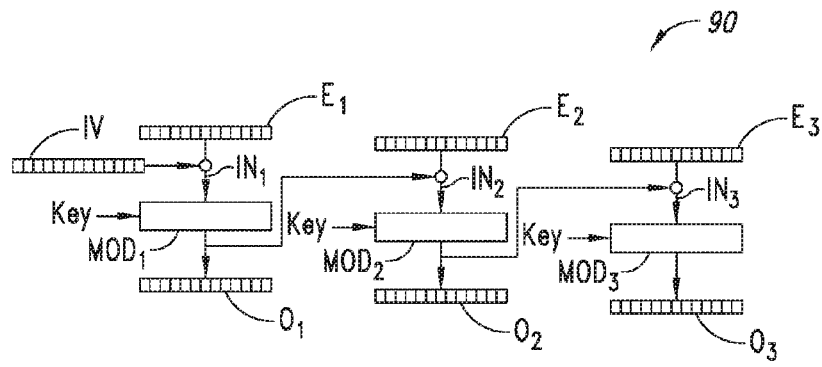
FIGS. 6 to 8 are simplified block diagrams of encryption circuits capable of implementing an encryption operation according to a block chaining operating mode.

FIG. 6 is a block diagram of an encryption circuit 90 illustrating the principle of an encryption operation according to a CBC operating mode. Circuit 90 comprises encryption modules $MOD_1$, $MOD_2$, $MOD_3$, three modules being shown in FIG. 6. Each encryption module MOD1, MOD2, MOD3 can make an encryption operation with the same key k. Circuit 90 receives, for each module $MOD_1$, $MOD_2$, $MOD_3$, a message block to be encrypted $E_1$, $E_2$, $E_3$ and provides, for each module $MOD_1$, $MOD_2$, $MOD_3$, an encrypted message block $O_1$, $O_2$ and $O_3$. Each module $MOD_1$, $MOD_2$, $MOD_3$ receives a number $IN_1$, $IN_2$, $IN_3$ and provides an encrypted message block $O_1$, $O_2$, $O_3$ by encryption of number $IN_1$, $IN_2$, $IN_3$ by using a key which is the same for all modules $MOD_1$, $MOD_2$, $MOD_3$.

The operating mode is called block chaining mode since each number which is encrypted by a module corresponds to the result of the XOR function applied between the input number of the module and the encrypted message block provided by the previous module. As shown in FIG. 6, number $IN_3$ is the result of the XOR function applied between numbers $E_3$ and $O_2$ and number $IN_2$ is the result of the XOR function applied between numbers $E_2$ and $O_1$. For first module $MOD_1$, number $IN_1$ is obtained by binary addition of number $E_1$ and of a number IV called initialization vector.

Figure 7:
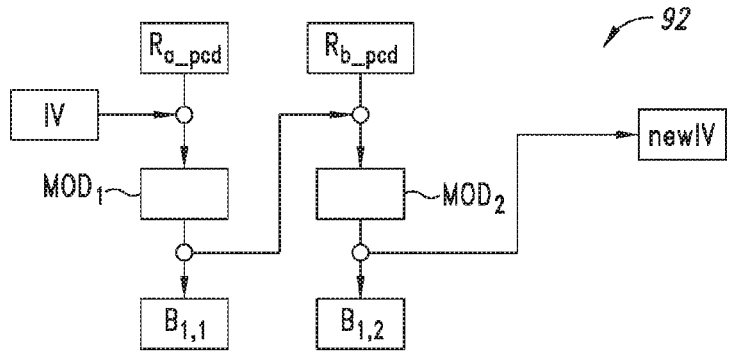

FIG. 7 is a block diagram of an encryption circuit 92 of the type shown in FIG. 6 capable of being implemented in the previously-described embodiments in the case where the encryption method corresponds to the AES algorithm or to the DES algorithm using one key or two keys. The length of each random number used by the reader or the card is then equal to the length of the number which can be encrypted by an encryption module, that is to say the cipher block length.

FIG. 7 shows, as an example, the encryption operation to obtain encrypted message $B_1$ based on random numbers $R_{a\_pcd}$ and $R_{b\_pcd}$. Encrypted message $B_1$ has twice length RL and divides into two juxtaposed blocks, a first block $B_{1,1}$ and a second block $B_{1,2}$, each having a length RL. Module $MOD_1$ receives the result of the XOR function applied between random number $R_{a\_pcd}$ and initialization vector IV and provides the first block $B_{1,1}$ of encrypted message $B_1$. Module $MOD_2$ receives the result of the XOR function applied between random number $R_{b\_pcd}$ and encrypted message block $B_{1,1}$ and provides the second block $B_{1,2}$ of encrypted message $B_1$. At the first encryption operation, initialization vector IV is, for example, equal to "0". Second block $B_{1,2}$ is used, for example, as an initialization vector IV at the next encryption operation. As a variation, IV is set equal to "0" for each encryption operation.

Figure 8:
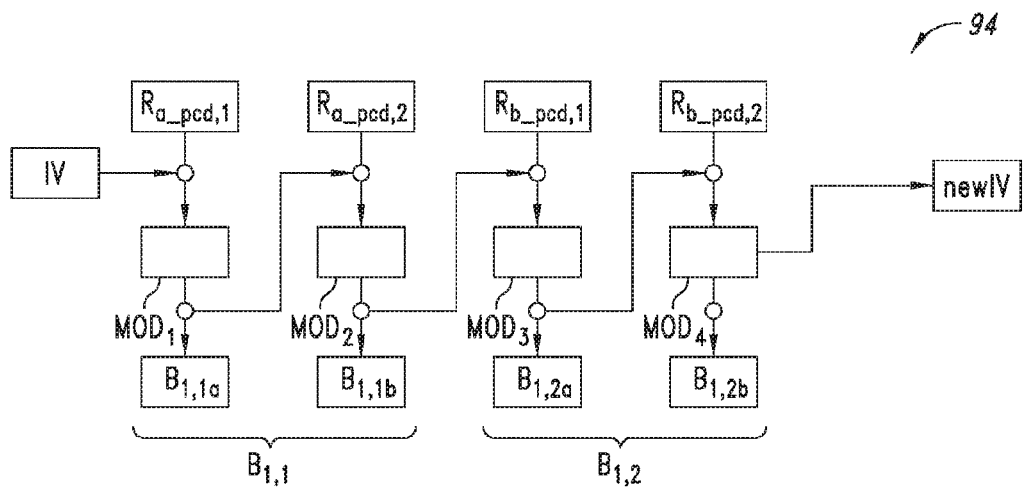

FIG. 8 is a block diagram of an encryption circuit 94 of the type shown in FIG. 6 capable of being implemented in the previously-described embodiments in the case where the encryption method corresponds to the DES algorithm using three keys. Length RL, in binary representation, of each random number used by the reader or the card is then equal to twice the length BL.

FIG. 8 shows, as an example, the encryption operation to obtain encrypted message $B_1$ based on random numbers $R_{a\_pcd}$ and $R_{b\_pcd}$. Encrypted message $B_1$ has four times length BL and divides into four juxtaposed blocks $B_{1,1a}$, $B_{1,1b}$, $B_{1,2a}$, and $B_{1,2b}$ of length BL. Random number $R_{a\_pcd}$ divides in two juxtaposed blocks $R_{a\_pcd,1}$ and $R_{a\_pcd,2}$ of length BL and random number $R_{b\_pcd}$ divides in two juxtaposed blocks $R_{b\_pcd,1}$ and $R_{b\_pcd,2}$ of length BL. Module $MOD_1$ receives the result of the XOR function applied between block $R_{a\_pcd,1}$ and initialization vector IV and provides the first block $B_{1,1a}$ of encrypted message $B_1$. Module $MOD_2$ receives the result of the XOR function applied between block $R_{a\_pcd,2}$ and encrypted message block $B_{1,1a}$ and provides the second block $B_{1,1b}$ of encrypted message $B_1$. Module $MOD_3$ receives the result of the XOR function applied between random number $R_{b\_pcd,1}$ and encrypted message block $B_{1,1b}$ and provides the third block $B_{1,2a}$ of encrypted message $B_1$. Module $MOD_4$ receives the result of the XOR function applied between block $R_{b\_pcd,2}$ and block $B_{1,2a}$ and provides the fourth block $B_{1,2b}$ of encrypted message $B_1$. Fourth block $B_{1,2b}$ is used, as example, as an initialization vector IV at the next encryption operation. The first and second juxtaposed blocks $B_{1,1a}$ and $B_{1,1b}$ form a first block $B_{1,1}$ of length RL of encryption message $B_1$ and the third and fourth juxtaposed blocks $B_{1,2a}$ and $B_{1,2b}$ form a second block $B_{1,2}$ of length RL of encrypted message $B_1$.

Figure 9:
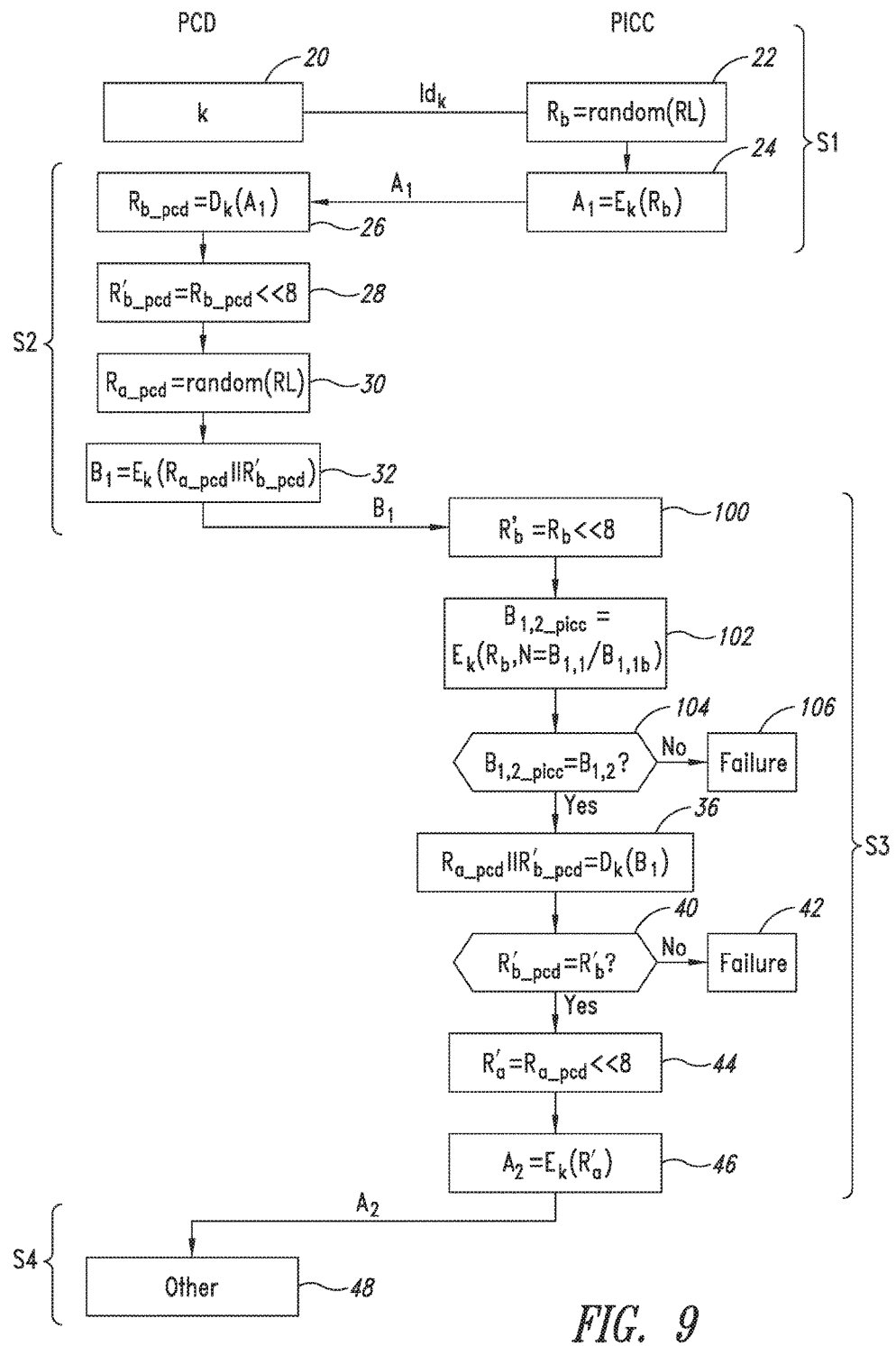
FIG. 9 is a simplified block diagram of another embodiment of a method of mutual authentication of a proximity device and a proximity coupling device.

FIG. 9 is a simplified block diagram of an embodiment of a method of authentication of a card by a reader.

In the present embodiment, at phase S3, additional steps are provided so that an attacker can no longer control the number used for an encryption or decryption operation.

More specifically, the embodiment of the authentication method comprises the steps of the authentication method previously described in relation with FIG. 2 with the difference that, at phase S3, step 38 is not present and that the card carries out at phase S3 additional steps 100, 102, 104, and 106 before step 36, described hereafter. The card determines random number $R'_b$ (step 100) based on random number $R_b$ by left rotating, in binary representation, the bits of random number $R_b$ by a plurality of bits, for example, 8 bits. The card implements the encryption method (step 102) by using key k and the random number $R'_b$ which is supplied, according to its length, to the first module or to the first modules of the encryption circuit. For the example of encryption method illustrated in FIG. 7 where each encryption module can receive a number having the same length RL as random number $R'_b$, random number $R'_b$ is supplied to the first encryption module. For the example of encryption method illustrated in FIG. 8 where each encryption module can receive a number having half length RL of random number $R'_b$, the first block of random number $R'_b$ is supplied to the first encryption module and the second block of random number $R'_b$ is supplied to the second encryption module. Further, the encryption method is carried out by using as an initial vector IV the last block of encrypted message $B_1$ which is associated with random number $R_{a\_pcd}$, that is, block $B_{1,1}$ of encrypted message $B_1$ for the example of encryption method illustrated in FIG. 7 and block $B_{1,1b}$ of encrypted message $B_1$ for the example of encryption method illustrated in FIG. 8. The first module or the first modules of the encryption circuit then provide an encrypted message block $B_{1,2\_picc}$ of length RL. The card then compares second block $B_{1,2}$ of encrypted message $B_1$ with encrypted message block $B_{1,2\_picc}$ (step 104). If the second block of encrypted message $B_1$ is different from number $B_{1,2\_picc}$, the card interrupts the authentication phase (step 106). If the two numbers are identical, the card carries on at previously described step 36.

As a variation, it is possible for steps 40 and 42 not to be present.

An attacker who desired to perform an attack at phase S3 may impose the encrypted message $B_1$ used by the card at phase S3. However, the attacker does not have access to random number $R'_b$. Since a XOR function is applied between random number $R'_b$ and a block of encrypted message B1, the attacker does not control the number used by the encryption modules during the encryption operation.

The previously-described embodiments are implemented on the card side and are transparent for the reader. They require no modification on the reader side. The cards thus formed (programmed) are thus compatible with existing readers.

Various embodiments have been described. Various alterations and modifications will occur to those skilled in the art. In particular, although the embodiments have been described in relation with a microcircuit card, they are compatible with a forming in any proximity communication device where similar problems are posed, for example, a cell phone equipped with a NFC router operating in card mode. Further, although the embodiments have been more specifically described in relation with an example of application to MIFARE transactions, they transpose to other applications where similar problems are posed. Further, the practical implementation of the described embodiments is within the abilities of those skilled in the art based on the functional indications given hereabove and by using or by programming circuits usual per se. In particular, a contactless integrated communication circuit to which these embodiments apply generally comprises at least one microprocessor, one or a plurality of volatile and non-volatile memory units, a proximity communication interface and, often, other circuits according to the hosted applications.

Various embodiments with different variations have been described hereabove. It should be noted that those skilled in the art may combine various elements of these various embodiments and variations without showing any inventive step. In particular, the embodiment previously described in relation with FIG. 9 may be implemented with any of the embodiments previously described in relation with FIGS. 3, 4 and 5.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
 authenticating a contactless communication circuit using a contactless communication terminal by successively performing a first phase, a second phase, and a third phase, wherein the first phase includes:
  performing an encryption operation with the contactless communication circuit to determine a first number, the encryption operation encrypting with a first key, a second number, the second number being a random number; and
  transmitting the first number from the contactless communication circuit to the contactless communication terminal, said transmitting the first number ending the first phase;
 wherein the second phase includes:
  performing a decryption operation with the contactless communication terminal to determine a third number, the decryption operation decrypting with the first key, the first number;
  determining, with the contactless communication terminal, a fourth number based on the third number;
  performing an encryption operation with the contactless communication terminal to determine a fifth number, the encryption operation encrypting with the first key, the fourth number, the fifth number having at least first and second juxtaposed portions; and
  transmitting the fifth number from the contactless communication terminal to the contactless communication circuit, said transmitting the fifth number ending the second phase, and
 wherein the third phase includes:
  determining, with the contactless communication circuit, a sixth number based on the second number;
  performing an encryption operation to determine a seventh number, the encryption operation including a cipher block chaining operating mode that encrypts with the first key, the sixth number and an initialization vector equal to a first portion of the fifth number; and
  interrupting the authenticating by the contactless communication circuit if the seventh number is different from a second portion of the fifth number.

2. The method of claim 1, further comprising:
 in the third phase, performing a decryption operation with the contactless communication circuit to provide the fourth number, the decryption operation decrypting with the first key, the fifth number.

3. The method of claim 1, further comprising, in the third phase:
 determining, with the contactless communication circuit, an eighth number based on the fourth number;
 performing an encryption operation to determine a ninth number, the encryption operation encrypting with the first key, the eighth number; and
 transmitting the ninth number from the contactless communication circuit to the contactless communication terminal, said transmitting the ninth number ending the third phase.

4. The method of claim 1, wherein encryption operations performed by the contactless communication circuit comprise:
 providing at least one first message block and one second message block;
 performing a first encryption operation to provide a first encrypted message block, the first encryption operation encrypting with the first key, a result of an XOR function applied between the first message block and an initialization vector; and
 performing a second encryption operation to provide a second encrypted message block, the second encryption operation encrypting with the first key, a result of an XOR function applied between the second message block and the first encrypted message block.

5. The method of claim 1, comprising, in the second phase:
 determining, by the contactless communication terminal, a tenth number, the tenth number being random; and
 determining, by the contactless communication terminal, an eleventh number based on the third number, the fourth number corresponding to the juxtaposition of the tenth number and of the eleventh number.

6. The method of claim 1, wherein determining the fourth number based on the third number comprises:
 at least one logical bitwise rotation of the third number.

7. The method of claim 1, wherein determining the sixth number based on the second number comprises:
 at least one logical bitwise rotation of the third number.

8. The method of claim 1, wherein the first phase, the second phase, and the third phase are successively performed a plurality of times.

9. The method of claim 1, wherein the second phase, the third number is equal to the second number.

10. A contactless communication circuit, comprising:
 a wireless communication circuit arranged to detect and electromagnetically exchange information with a contactless communication terminal when the contactless communication circuit is in proximity of the contactless communication terminal; and
 a microprocessor programmed to generate the information sent to the contactless communication terminal and analyze the information received from the contactless communication terminal in at least three phases including a first phase that includes:
  encrypting with a first key, a random first number to produce a first encrypted message; and
  transmitting the first encrypted message from the contactless communication circuit to the contactless communication terminal, said transmitting the first encrypted message ending the first phase;

wherein the at least three phases includes a second phase that includes:
 receiving from the contactless communication terminal a second encrypted message, the second encrypted message generated from a decryption of the first encrypted message and a random second number, receipt of the second encrypted message ending the second phase, and
wherein the at least three phases includes a third phase that includes:
 determining a third number based on the first number;
 performing an encryption operation to determine an encrypted fourth number, the encryption operation including a cipher block chaining operating mode that encrypts with the first key, the third number and an initialization vector equal to a first portion of the second encrypted message; and
 interrupting the authenticating by the contactless communication circuit if the fourth number is different from a second portion of the second encrypted message.

11. The contactless communication circuit of claim 10, wherein encryption operations performed by the contactless communication circuit comprise:
 providing at least one first message block and one second message block;
 performing a first encryption operation to provide a first encrypted message block, the first encryption operation encrypting with the first key, a result of an XOR function applied between the first message block and an initialization vector; and
 performing a second encryption operation to provide a second encrypted message block, the second encryption operation encrypting with the first key, a result of an XOR function applied between the second message block and the first encrypted message block.

12. The contactless communication circuit of claim 10, wherein performing at least one logical operation on the decrypted message comprises:
 at least one logical bitwise rotation of at least some bits of the decrypted message.

13. The contactless communication circuit of claim 10, wherein the first phase, the second phase, and the third phase are successively performed a plurality of times.

14. The contactless communication circuit of claim 10, wherein the wireless communication circuit conforms to a near field communications (NFC) protocol.

15. A multiphase authentication method between a wireless terminal and a wireless device, comprising:
 encrypting with a first key, a first random number to produce an first encrypted message;
 transmitting the first encrypted message from the wireless device to the wireless terminal;
 decrypting with the first key, the first encrypted message to retrieve the first random number;
 modifying the retrieved first random number;
 encrypting, with the wireless terminal and the first key, a logical combination of the modified retrieved first random number and a second value to produce a second encrypted message;
 transmitting the second encrypted message from the wireless terminal to the wireless device;
 determining, with the wireless device, a third value based on the first random number;
 performing an encryption operation to determine a fourth value, the encryption operation including a cipher block chaining operating mode that encrypts with the first key, the third value and an initialization vector equal to a first portion of the second encrypted message; and
 interrupting the authenticating by the wireless device if the fourth is different from a second portion of the second encrypted message;
 decrypting with the first key the second encrypted message to produce a decrypted message;
 performing at least one logical operation on the decrypted message;
 testing whether or not the decrypted message is authentic;
 if the decrypted message is authentic, performing an encryption operation to produce a third encrypted message, the encryption operation including a cipher block chaining operating mode that encrypts with the first key, at least a portion of the decrypted message and at least a portion of an initialization vector; and
 transmitting the third encrypted message from the contactless communication circuit to the contactless communication terminal.

16. The multiphase authentication method between the wireless terminal and the wireless device of claim 15, wherein encryption operations performed by the wireless device comprise:
 providing at least one first message block and one second message block;
 performing a first encryption operation to provide a first encrypted message block, the first encryption operation encrypting with the first key, a result of an XOR function applied between the first message block and an initialization vector; and
 performing a second encryption operation to provide a second encrypted message block, the second encryption operation encrypting with the first key, a result of an XOR function applied between the second message block and the first encrypted message block.

17. The multiphase authentication method between the wireless terminal and the wireless device of claim 15, wherein modifying the retrieved first random number comprises:
 performing at least one logical bitwise rotation of at least some bits of the decrypted message.

18. The multiphase authentication method between the wireless terminal and the wireless device of claim 15, wherein if the decrypted message is not authentic, asserting at least one value to prevent further encryption operations using the first key.

19. The multiphase authentication method between the wireless terminal and the wireless device of claim 15, wherein the wireless device includes at least one near field communications (NFC) router.

* * * * *